United States Patent
Ahn et al.

(10) Patent No.: US 9,510,300 B2
(45) Date of Patent: *Nov. 29, 2016

(54) METHOD AND APPARATUS FOR CONTROLLING UPLINK TRANSMISSION POWER

(71) Applicant: LG ELECTRONICS INC., Seoul (KR)

(72) Inventors: Joon Kui Ahn, Anyang-si (KR); Dong Youn Seo, Anyang-si (KR); Suck Chel Yang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 67 days.

This patent is subject to a terminal disclaimer.

(21) Appl. No.: 14/009,683

(22) PCT Filed: Sep. 25, 2012

(86) PCT No.: PCT/KR2012/007712
§ 371 (c)(1),
(2) Date: Oct. 3, 2013

(87) PCT Pub. No.: WO2013/043027
PCT Pub. Date: Mar. 28, 2013

(65) Prior Publication Data
US 2014/0056251 A1    Feb. 27, 2014

Related U.S. Application Data

(60) Provisional application No. 61/538,929, filed on Sep. 25, 2011.

(51) Int. Cl.
*H04W 52/04*    (2009.01)
*H04W 74/08*    (2009.01)
(Continued)

(52) U.S. Cl.
CPC ......... *H04W 52/243* (2013.01); *H04W 52/146* (2013.01); *H04L 5/001* (2013.01);
(Continued)

(58) Field of Classification Search
CPC ............. H04W 52/146; H04W 52/50; H04W 74/0833; H04W 52/04; H04W 52/38
See application file for complete search history.

(56) References Cited

U.S. PATENT DOCUMENTS 8,780,855 B2    7/2014  Ohta et al.
2009/0316638 A1*  12/2009  Yi .................. H04W 74/002
                                                                                          370/329

(Continued)

FOREIGN PATENT DOCUMENTS

CN       1949683 A    4/2007
EP       2712246 A1   3/2014
(Continued)

OTHER PUBLICATIONS

3rd Generation Partnership Projects; Technical Specification Group Radio Access Network; Evolved Universal Terrestrial Radio Access (E-UTRA); Physical Layer Procedures (Release 10); 3GPP TS36. 213 V10.2.0 (Jun. 2011), 120 pages.

(Continued)

*Primary Examiner* — Scott M Sciacca
(74) *Attorney, Agent, or Firm* — Birch, Stewart, Kolasch & Birch, LLP

(57) ABSTRACT

Provided are a method and apparatus for controlling uplink transmission power in a wireless communication system. A terminal transmits a random access preamble in a secondary cell, and receives a random access response in a primary cell. The terminal determines a transmission power for an uplink channel transmitted in the second cell based on the transmit power command (TPC) within the random access response.

18 Claims, 8 Drawing Sheets

(51) Int. Cl.
  *H04W 52/24*  (2009.01)
  *H04W 52/14*  (2009.01)
  *H04L 5/00*   (2006.01)
  *H04W 52/40*  (2009.01)
  *H04W 52/08*  (2009.01)
  *H04W 52/32*  (2009.01)
  *H04W 52/36*  (2009.01)
  *H04W 52/50*  (2009.01)

(52) U.S. Cl.
  CPC .......... *H04W 52/08* (2013.01); *H04W 52/325* (2013.01); *H04W 52/367* (2013.01); *H04W 52/40* (2013.01); *H04W 52/50* (2013.01)

(56) References Cited

U.S. PATENT DOCUMENTS

| | | |
|---|---|---|
| 2010/0316016 A1 | 12/2010 | Kim et al. |
| 2011/0086659 A1* | 4/2011 | Yoon et al. ............ 455/509 |
| 2011/0243087 A1 | 10/2011 | Ahn et al. |
| 2012/0140689 A1* | 6/2012 | Pelletier et al. ........... 370/311 |
| 2012/0275390 A1* | 11/2012 | Korhonen et al. .......... 370/329 |
| 2012/0282970 A1* | 11/2012 | Kela et al. ............ 455/522 |
| 2013/0010711 A1* | 1/2013 | Larsson et al. ........... 370/329 |
| 2013/0028198 A1* | 1/2013 | Yamada ............ H04W 56/0005 370/329 |
| 2013/0182654 A1* | 7/2013 | Hariharan et al. .......... 370/329 |
| 2013/0250925 A1* | 9/2013 | Lohr ............ H04W 56/0045 370/336 |
| 2014/0029558 A1* | 1/2014 | Frederiksen et al. ........ 370/329 |

FOREIGN PATENT DOCUMENTS

| | | |
|---|---|---|
| KR | 10-2009-0081311 A | 7/2009 |
| KR | 10-2011-0018780 A | 2/2011 |
| KR | 10-2011-0097900 A | 8/2011 |
| WO | WO 2011/099151 A1 | 8/2011 |

OTHER PUBLICATIONS

Catt, "CC Linkage of RA on SCell," 3GPP TSG RAN WG2 Meeting #75, Agenda Item 7.1.1.2, R2-113822, Aug. 22-26, 2011, Athens, Greece, 4 pages.

Nokia Siemens Networks et al., "Cross Scheduling for RACH on SCell," 3GPP TSG-RAN WG2 Meeting #75, Agenda Item 7.1.1.2, R2-114019, Aug. 22-26, 2011, Athens, Greece, 3 pages.

3GPP, "3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321, V10.1.0., Mar. 2011, pp. 1-53.

3GPP, "3rd Generation Partnership Project; Technical Specification Group Radio Access Network; Evolved Universal Terrestrial Radio Access (E-UTRA); Physical layer procedures (Release 10)", 3GPP TS 36.213, V10.2.0, Jun. 2011, pp. 1-120.

3GPP, "3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331, V10.1.0, Mar. 2011, pp. 1-290.

Catt, "Support of multiple timing advances in LTE-A Rel-11 with CA", 3GPP TSG RAN WG1 Meeting #66, Athens, Greece, Aug. 22-26, 2011, R1-112107, pp. 1-4.

Huawai et al., "Location of Msg2 for RACH on SCell", 3GPP TSG-RAN WG2 Meeting #75, Athens, Greece, Aug. 22-26, 2011, R2-113995, 4 pages.

Texas Instruments, "Support of Multiple Timing Advance Commands," 3GPP TSG RAN WG1 #66, Athens, Greece, Aug. 22-26, 2011, R1-112153, pp. 1-3.

\* cited by examiner

METHOD AND APPARATUS FOR CONTROLLING UPLINK TRANSMISSION POWER

CROSS-REFERENCE TO RELATED APPLICATIONS

This non-provisional application is a National Stage entry under U.S.C. §371 of International Application No. PCT/KR2012/007712 filed on Sep. 25, 2012, which claims the benefit of U.S. Provisional Application No. 61/538,929 filed on Sep. 25, 2011. The entire contents of all of the above applications are hereby incorporated by reference.

TECHNICAL FIELD

The present invention relates to wireless communications, and more particularly, to a method and apparatus for controlling uplink transmit power in a wireless communication system.

BACKGROUND ART $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V8.7.0 (2009-05) "Evolved Universal Terrestrial Radio Access (E-UTRA); Physical Channels and Modulation (Release 8)", a physical channel of 3GPP LTE/LTE-A can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

To decrease an interference caused by uplink transmission between user equipments (UEs), it is important for a base station (BS) to maintain an uplink time alignment of the UEs. The UE may be located in any area in a cell. An uplink signal transmitted by the UE may arrive to the BS at a different time according to the location of the UE. A signal arrival time of a UE located in a cell edge is longer than a signal arrival time of a UE located in a cell center. On the contrary, the signal arrival time of the UE located in the cell center is shorter than the signal arrival time of the UE located in the cell edge.

To decrease the interference between the UEs, the BS needs to perform scheduling so that uplink signals transmitted by the UEs in the cell can be received every time within a boundary. The BS has to properly adjust transmission timing of each UE according to a situation of each UE. Such an adjustment is called an uplink time alignment. A random access process is one of processes for maintaining the uplink time alignment.

In addition, transmit power of the UE needs to be adjusted to mitigate an interference caused by uplink transmission. It is difficult for the BS to receive uplink data if the transmit power of the UE is too low. If the transmit power of the UE is too high, uplink transmission may cause a significant interference to transmission of another UE.

Recently, multiple serving cells are introduced to provide a higher data rate. The control of uplink transmit power using the conventional random access procedure is designed by considering only one serving cell.

DISCLOSURE OF THE INVENTION

The present invention provides a method and apparatus for controlling uplink transmit power in consideration of multiple serving cells.

In one aspect, there is provided a method for controlling uplink transmit power in a wireless communication system. The method may comprise transmitting, by a user equipment (UE), a random access preamble to a secondary cell; receiving, by the UE, a random access response in response to the random access preamble from a primary cell, wherein the random access response includes a transmit power command (TPC) and a timing advance command (TAC) indicating a time alignment value which is sent to maintain an uplink time alignment; and determining, by the UE, transmit power of an uplink channel to be transmitted to the secondary cell based on the TPC.

The random access response may further include an uplink resource assignment for a scheduled message, and the uplink channel may be configured by the uplink resource assignment.

The primary cell and the secondary cell may belong to different timing advance (TA) groups and the same time alignment value may be applied to all cells belonging to one TA group In another aspect, there is provided a terminal for controlling uplink transmit power in a wireless communication system. The terminal may comprise a radio frequency (RF) unit for transmitting and receiving a radio signal; and a processor operatively coupled to the RF unit. The processor may be configured for transmitting a random access preamble to a secondary cell; receiving a random access response in response to the random access preamble from a primary cell, wherein the random access response includes a TPC and a TAC indicating a time alignment value which is sent to maintain an uplink time alignment; and determining transmit power of an uplink channel to be transmitted to the secondary cell based on the TPC.

In a wireless communication system in which a time alignment is applied for each serving cell or for each serving cell group, uplink transmit power can be determined during a random access procedure, and an interference between user equipments can be decreased.

MODES FOR CARRYING OUT THE PREFERRED EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station (BS) is generally a fixed station that communicates with the wireless device and may be referred to as another terminology, such as an evolved node-B (eNB), a base transceiver system (BTS), an access point, etc.

Hereinafter, the present invention is applied based on a $3^{rd}$ generation partnership project (3GPP) long term evolution (LTE) or a 3GPP LTE-Advanced (LTE-A). This is for exemplary purposes only, and thus the present invention is applicable to various communication systems. In the following description, LTE and/or LTE-A are collectively referred to as LTE.

Figure 1:
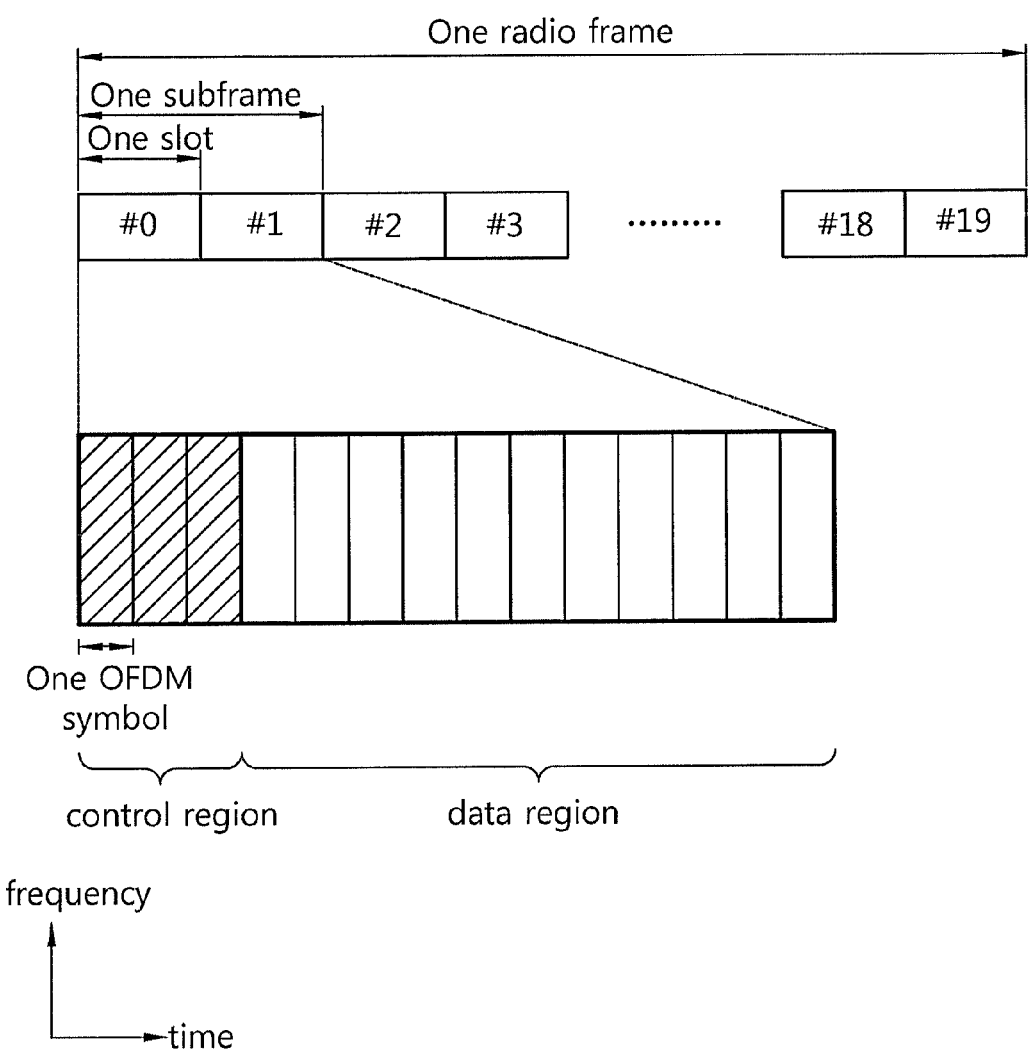
FIG. 1 shows a downlink radio frame structure in $3^{rd}$ generation partnership project (3GPP) long term evolution (LTE).

FIG. 1 shows a downlink radio frame structure in $3^{rd}$ generation partnership project (3GPP) long term evolution (LTE). The section 6 of 3GPP TS 36.211 V8.7.0 (2009-05) "Evolved Universal Terrestrial Radio Access (E-UTRA); Physical Channels and Modulation (Release 8)" may be incorporated herein.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to first three OFDM symbols of a $1^{st}$ slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH is transmitted by using a fixed PCFICH resource of the subframe, without having to perform blind decoding.

The PHICH carries a positive-acknowledgement (ACK)/negative-acknowledgement (NACK) signal for an uplink hybrid automatic repeat request (HARQ). The ACK/NACK signal for UL data on a PUSCH transmitted by the UE is transmitted on the PHICH.

A physical broadcast channel (PBCH) is transmitted in first four OFDM symbols in a $2^{nd}$ slot of a $1^{st}$ subframe of a radio frame. The PBCH carries system information necessary for communication between the UE and the BS. The system information transmitted through the PBCH is referred to as a master information block (MIB). In comparison thereto, system information transmitted on the PDCCH indicated by the PDCCH is referred to as a system information block (SIB).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The 3GPP LTE uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of the available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a UE having a good DL channel state can use one CCE in PDCCH transmission. A UE having a poor DL channel state can use 8 CCEs in PDCCH transmission.

A control channel consisting of one or more CCEs performs interleaving in an REG unit, and is mapped to a physical resource after performing cyclic shift based on a cell identifier (ID).

Now, maintaining of a UL time alignment in 3GPP LTE will be described.

To decrease an interference caused by UL transmission between UEs, it is important for a BS to maintain a UL time alignment of the UEs. The UE may be located in any area in a cell. A UL signal transmitted by the UE may arrive to the BS at a different time according to the location of the UE. A signal arrival time of a UE located in a cell edge is longer than a signal arrival time of a UE located in a cell center. On the contrary, the signal arrival time of the UE located in the cell center is shorter than the signal arrival time of the UE located in the cell edge.

To decrease the interference between the UEs, the BS needs to perform scheduling so that UL signals transmitted by the UEs in the cell can be received every time within a boundary. The BS has to properly adjust transmission timing of each UE according to a situation of each UE. Such an adjustment is called a time alignment maintenance.

A random access procedure is one of methods for managing the time alignment. The UE transmits a random access preamble to the BS. The BS calculates a time alignment value for advancing or delaying transmission timing of the UE on the basis of the received random access preamble. In addition, the BS transmits a random access response including the calculated time alignment value to the UE. The UE updates the transmission timing by using the time alignment value.

In another method, the BS receives a sounding reference signal from the UE periodically or randomly, calculates the time alignment value of the UE by using the sounding reference signal, and reports a MAC control element (CE) to the UE.

The time alignment value is information sent by the BS to the UE to maintain uplink time alignment. A timing alignment command indicates this information.

Since the UE has mobility in general, the transmission timing of the UE varies depending on a moving speed, a location, or the like of the UE. Therefore, the time alignment value received by the UE is preferably valid during a specific time period. For this, a time alignment timer is used.

When the time alignment is updated after receiving the time alignment value from the BS, the UE starts or restarts the time alignment timer. The UE can perform UL transmission only when the time alignment timer is running. A value of the time alignment timer may be reported by the BS to the UE by using system information or an RRC message such as a radio bearer reconfiguration message.

When the time alignment timer expires or when the time alignment timer does not run, the UE does not transmit any uplink signal except for the random access preamble under the assumption that time alignment is not achieved between the BS and the UE.

Figure 2:
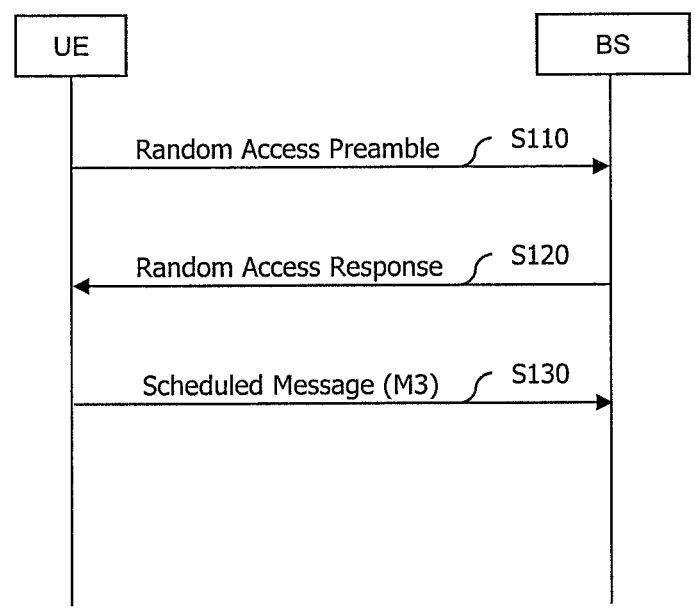
FIG. 2 is a flowchart showing a random access procedure in 3GPP LTE.

FIG. 2 is a flowchart showing a random access procedure in 3GPP LTE. The random access procedure is used by a UE to acquire a UL time alignment with a BS or to allocate a UL radio resource.

The UE receives a root index and a physical random access channel (PRACH) configuration index from the BS. Each cell has 64 candidate random access preambles defined by a Zadoff-Chu (ZC) sequence. The root index is a logical index for generating the 64 candidate random access preambles by the UE.

The random access preamble is limited to a specific time and frequency resource for each cell. The PRACH configuration index indicates a specific subframe and preamble format capable of transmitting the random access preamble.

Table 1 below shows an example of the random access configuration disclosed in the section 5.7 of 3GPP TS 36.211 V8.7.0 (2009-05).

TABLE 1

| PRACH configuration index | Preamble format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |

The HE transmits a randomly selected random access preamble to the BS (step S110). The UE selects one of the 64 candidate random access preambles. In addition, the UE selects a corresponding subframe by using the PRACH configuration index. The UE transmits the selected random access preamble in the selected subframe.

Upon receiving the random access preamble, the BS transmits a random access response (RAR) to the UE (step S120). The RAR is detected in two steps. First, the UE detects a PDCCH masked with a random access-RNTI (RA-RNTI). The UE receives the RAR included in a medium access control (MAC) protocol data unit (PDU) through a PDSCH indicated by the detected PDCCH.

Figure 3:
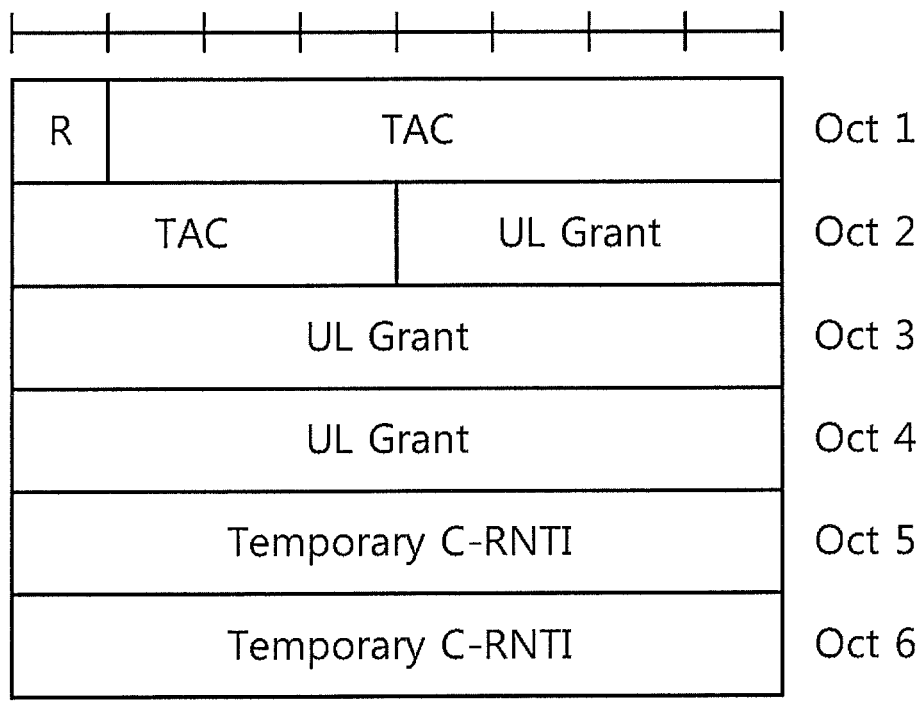
FIG. 3 shows an example of a random access response.

FIG. 3 shows an example of a random access response (RAR).

The RAR may include a TAC, a UL grant, and a temporary C-RNTI.

The TAC is information indicating a time alignment value sent by a BS to a UE to maintain a UL time alignment. The UE updates UL transmission timing by using the time alignment value. When the UE updates the time alignment, a time alignment timer starts or restarts.

The UL grant includes a UL resource assignment and a transmit power command (TPC) used to transmit a scheduling message described below. The TPC is used to determine transmit power for a scheduled PUSCH.

Referring back to FIG. 2, the UE transmits a scheduled message to the BS according to a UL grant included in the RAR (step S130).

Hereinafter, the random access preamble, the RAR, and the scheduled message are respectively called messages M1, M2, and M3.

Now, UL transmit power in 3GPP LTE will be described with reference to the section 5 of 3GPP TS 36.213 V8.7.0 (2009-05).

Transmit power $P_{PUSCH}(i)$ for PUSCH transmission at a subframe i is defined as follows.

$$P_{PUSCH}(i) = \min\{P_{CMAX}, 10\log_{10}(M_{PUSCH}(i)) + P_{O\_PUSCH}(j) + \alpha(j)PL + \Delta_{TF}(i) + f(i)\} \quad \text{[Equation 1]}$$

Herein, $P_{CMAX}$ denotes a configured UE transmit power, and $M_{PUSCH}(i)$ denotes a bandwidth of a PUSCH resource assignment based on an RB unit. $P_{O\_PUSCH}(j)$ denotes a parameter composed of the sum of a cell-specific element $P_{O\_NOMINAL\_PUSCH}(j)$ and a UE-specific element $P_{OE\_UE\_PUSCH}(j)$ which are provided by a higher layer when j=0 and 1. $\alpha(j)$ denotes a parameter provided to the higher layer. PL denotes a downlink path-loss estimation calculated by the UE. $\Delta_{TF}(i)$ denotes a UE-specific parameter. f(i) denotes a UE-specific value derived from TPC. min{A,B} denotes a function for returning a smaller value between A and B.

Transmit power $P_{PUCCH}(i)$ for PUCCH transmission at a subframe i is defined as follows.

$$P_{PUCCH}(i) = \min\{P_{CMAX}, P_{0\_PUCCH} + PL + h(n_{CQI}, n_{HARQ}) + \Delta_{F\_PUCCH}(F) + g(i)\}$$ [Equation 2]

Herein, $P_{CMAX}$ and PL are the same as those of Equation 1, and $P_{O\_PUCCH}(j)$ denotes a parameter composed of the sum of a cell-specific element $P_{O\_NOMINAL\_PUCCH}(j)$ and a UE-specific element $P_{O\_UE\_PUCCH}(j)$ which are provided from a higher layer. $h(n_{CQI}, n_{HARQ})$ denotes a value dependent on a PUCCH format. $\Delta_{F\_PUCCH}(F)$ denotes a parameter provided by the higher layer. g(i) denotes a UE-specific value derived from TPC.

Transmit power $P_{SRS}(i)$ for SRS transmission at a subframe i is defined as follows.

$$P_{SRS}(i) = \min\{P_{CMAX}, P_{SRS\_OFFSET} + 10\log_{10}(M_{SRS}) + P_{O\_PUSCH}(j) + \alpha(j)PL + f(i)\}$$ [Equation 3]

Herein, $P_{CMAX}$, $P_{O\_PUSCH}(j)$, $\alpha(j)$, PL, and f(i) are the same as those of Equation 2, $P_{SRS\_OFFSET}$ denotes a UE-specific parameter provided by a higher layer, and $M_{SRS}$ denotes a bandwidth for SRS transmission.

Now, a multiple carrier system will be described.

A 3GPP LTE system supports a case in which a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (or also referred to as bandwidth aggregation or carrier aggregation) supports multiple CCs. For example, if 5 CCs are assigned as a granularity of a carrier unit having a bandwidth of 20 MHz, a bandwidth of up to 100 MHz can be supported.

One DL CC or a pair of a UL CC and a DL CC can be mapped to one cell. Therefore, when a UE communicates with a BS through multiple CCs, it can be said that the UE receives a service from multiple serving cells.

Figure 4:
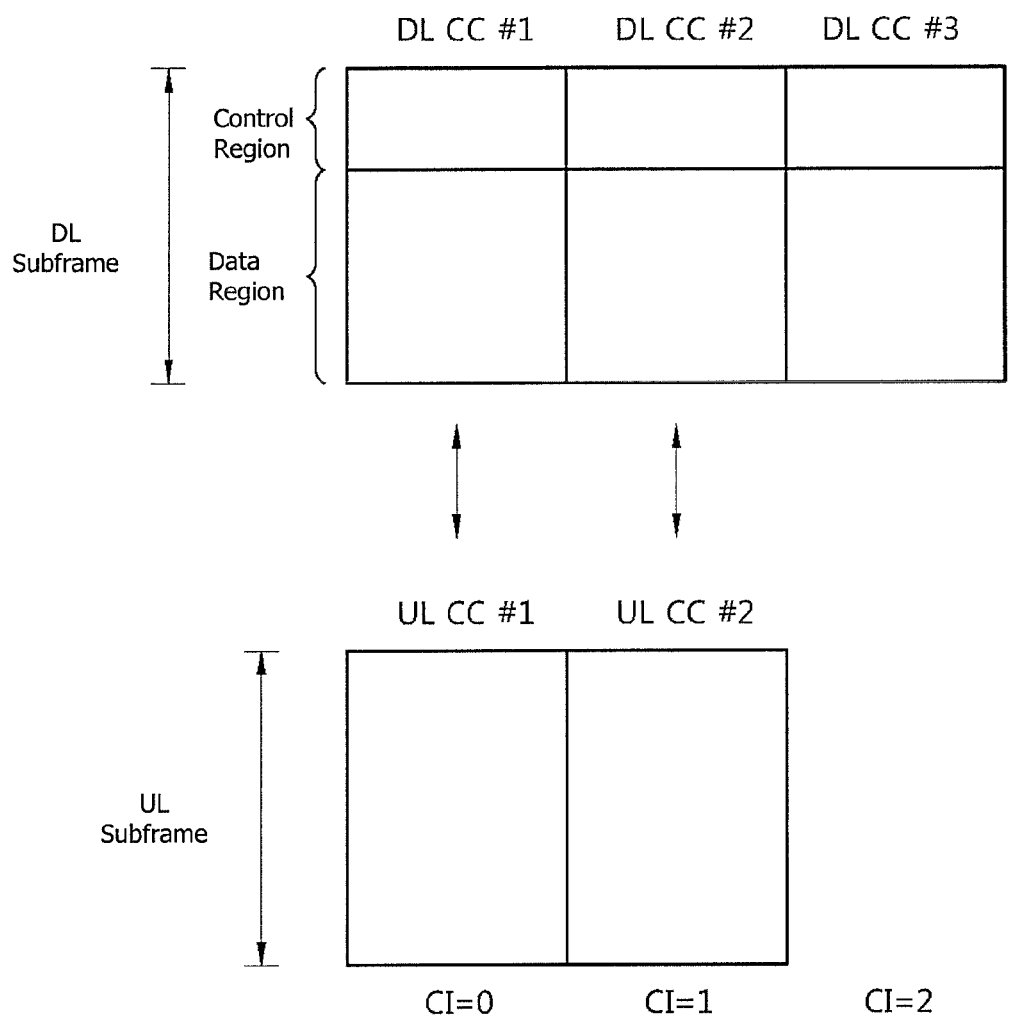
FIG. 4 shows an example of multiple carriers.

FIG. 4 shows an example of multiple carriers.

Although 3 DL CCs and 3 UL CCs are shown herein, the number of DL CCs and the number of UL CCs are not limited thereto. A PDCCH and a PDSCH are independently transmitted in each DL CC. A PUCCH and a PUSCH are independently transmitted in each UL CC. Since 3 DL CC-UL CC pairs are defined, it can be said that a UE receives a service from 3 serving cells.

The UE can monitor the PDCCH in multiple DL CCs, and can receive a DL transport block simultaneously via the multiple DL CCs. The UE can transmit multiple UL transport blocks simultaneously via multiple UL CCs.

It is assumed that a pair of a DL CC #1 and a UL CC #1 is a $1^{st}$ serving cell, a pair of a DL CC #2 and a UL CC #2 is a $2^{nd}$ serving cell, and a DL CC #3 is a $3^{rd}$ serving cell. Each serving cell can be identified by using a cell index (CI). The CI may be cell-specific or UE-specific. Herein, CI=0, 1, 2 are assigned to the $1^{st}$ to $3^{rd}$ serving cells for example.

The serving cell can be classified into a primary cell (or pcell) and a secondary cell (or scell). The primary cell operates at a primary frequency, and is a cell designated as the primary cell when the UE performs an initial network entry process or starts a network re-entry process or performs a handover process. The primary cell is also called a reference cell. The secondary cell operates at a secondary frequency. The secondary cell can be configured after an RRC connection is established, and can be used to provide an additional radio resource. At least one primary cell is configured always. The secondary cell can be added/modified/released by using higher-layer signaling (e.g., RRC messages).

The CI of the primary cell may be fixed. For example, a lowest CI can be designated as a CI of the primary cell. It is assumed hereinafter that the CI of the primary cell is 0 and a CI of the secondary cell is allocated sequentially starting from 1.

The UE can monitor a PDCCH through multiple serving cells. However, even if there are N serving cells, the BS can be configured to monitor the PDCCH for M (M≤N) serving cells. In addition, the BS can be configured to preferentially monitor the PDCCH for L (L≤M≤N) serving cells.

In the conventional 3GPP LTE, even if the UE supports multiple CCs, one timing alignment (TA) value is commonly applied to the multiple CCs. However, a propagation property may change since the multiple CCs are spaced apart from each other to a great extent in a frequency domain. For example, a remote radio header (RRH) and devices may exist in an area of the BS to extend a coverage or to remove a coverage hole.

Figure 5:
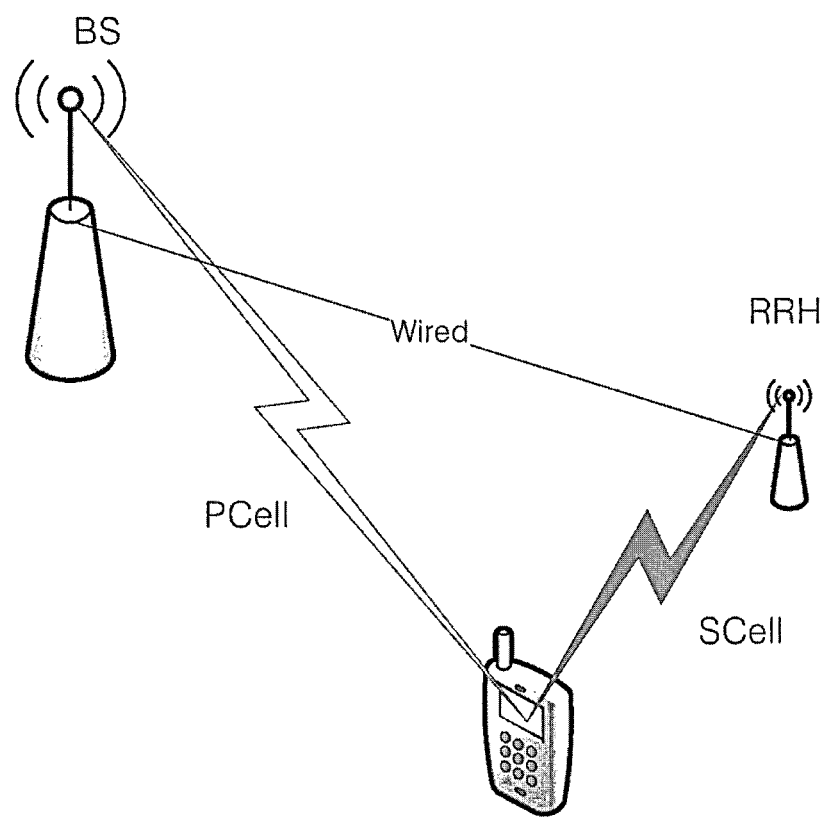
FIG. 5 shows an uplink (UL) propagation difference among multiple cells.

FIG. 5 shows a UL propagation difference among multiple cells.

A UE is served by a primary cell and a secondary cell. The primary cell provides a service by using a BS, and the secondary cell provides a service by using an RRH coupled to the BS. A propagation delay property of the primary cell may be different from a propagation delay property of the secondary cell due to a distance between the BS and the RRH, a processing time of the RRH, etc.

In this case, if the same TA value is applied to the primary cell and the secondary cell, it may have a significant effect on a time alignment of a UL signal.

Figure 6:
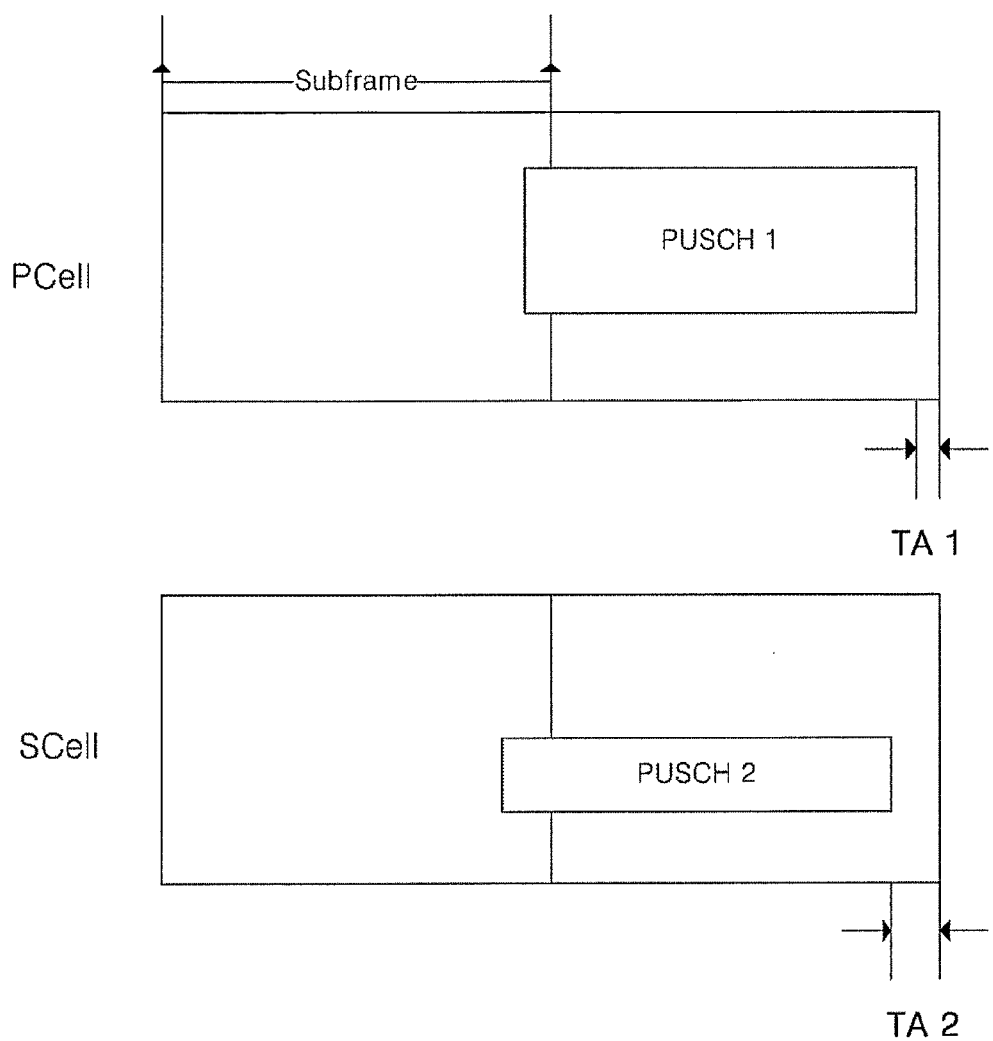
FIG. 6 shows an example in which a timing alignment (TA) varies among multiple cells.

FIG. 6 shows an example in which a TA varies among multiple cells.

An actual TA of a primary cell is 'TA 1', and an actual TA of a secondary TA is 'TA 2'. Therefore, it is necessary to apply an independent TA for each serving cell.

To apply the independent TA, a TA group is defined. The TA group includes one or more cells to which the same TA is applied. The TA is allocated for each TA group, and a time alignment timer operates for each TA group.

Hereinafter, two serving cells, i.e., the primary cell and the secondary cell, are considered, and it is assumed that the primary cell belongs to a first TA group, and the secondary cell belongs to a secondary TA group. The number of serving cells and TA groups are for exemplary purposes only. In addition, the primary cell and the secondary cell are for exemplary purposes only, and thus the present invention is also applicable to a case where at least two primary cells, at least two secondary cells, and at least two TA groups are present.

Figure 7:
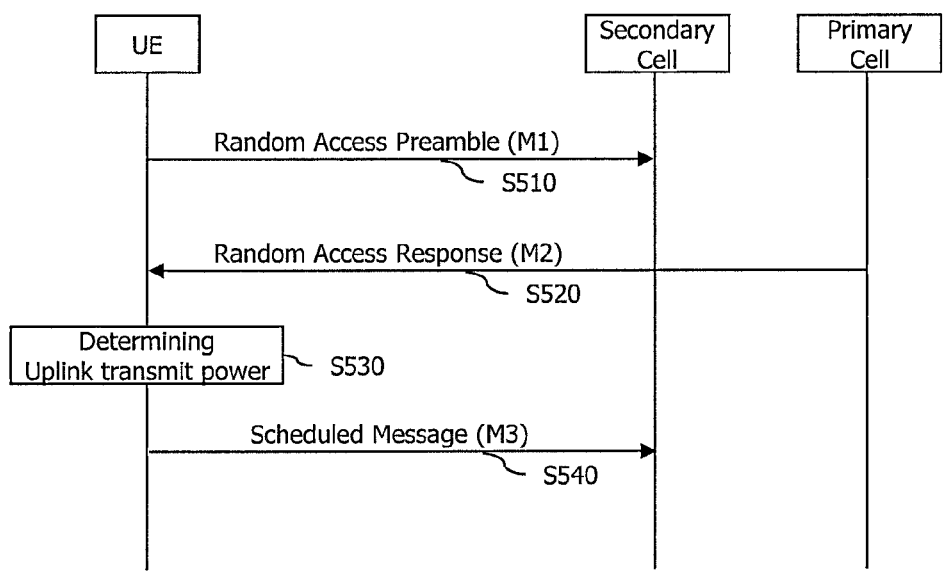
FIG. 7 is a flowchart showing a UL transmit power control method according to an embodiment of the present invention.

FIG. 7 is a flowchart showing a UL transmit power control method according to an embodiment of the present invention.

A UE transmits a random access preamble from a secondary cell (step S510). The random access preamble may be selected from a plurality of candidate random access preambles. The secondary cell may be a cell activated by a primary cell.

The UE receives a random access response (RAR) from the primary cell (step S520). First, the UE detects a PDCCH masked with a RA-RNTI of the primary cell. The UE may receive the RAR included in a MAC PDU through a PDSCH indicated by the detected PDCCH.

As shown in FIG. 3, the RAR may include a TAC and a UL grant. The UL grant may include a UL resource assignment and a TPC used to transmit a scheduling message described below. Alternatively, the UL grant of the RAR may include only the TPC without the UL resource assignment.

When the random access preamble and the RAR are received in different cells (or TA groups), there is an ambiguity about whether to apply a TPC of the RAR to a cell to which the random access preamble is transmitted or a cell from which the RAR is received.

In general, it can be assumed that the random access preamble is transmitted from the secondary cell in a situation where a time alignment timer expires since there is no UL transmission in the secondary cell during a relatively long period of time or a situation where there is no proper configuration for UL transmit timing or UL transmit power after the secondary cell is activated. Therefore, according to the proposed invention, it is proposed to use a TPC included in the RAR in controlling transmit power of a cell to which the random access preamble is transmitted.

The UE determines transmit power of a UL channel of the secondary cell on the basis of the TPC included in the RAR (step S530). The UL channel may include at least one of a PUCCH, a PUSCH, and an SRS.

The UE transmits a scheduled message through the PUSCH to the secondary cell according to a UL resource assignment included in the RAR (step S540). The transmit power of the PUSCH may be controlled based on the TPC. The TAC included in the RAR may be applied to the secondary cell.

If the scheduled message is transmitted to another cell other than the cell to which the random access preamble is transmitted, the TPC included in the RAR is used to control transmit power of the cell to which the random access preamble is transmitted, and transmit power of a UL channel via which the scheduling message is transmitted may be controlled by using a predetermined method.

A method of determining the transmit power of the UL channel of the secondary cell on the basis of the TPC included in the RAR is as follows.

Transmit power $P_{PUSCH}(i)$ of a PUSCH transmitted at a subframe of the secondary cell may be determined by the following equation.

$$P_{PUSCH}(i) = \min\{P_{CMAX}(i), 10 \log_{10}(M_{PUSCH}(i)) + P_{O\_PUSCH}(j) + \alpha(j)PL + \Delta_{TF}(i) + f(i)\}$$ [Equation 4]

Herein, $P_{CMAX}(i)$ denotes a terminal's transmit power configured at a subframe i, $M_{PUSCH}(i)$ denotes a bandwidth of a PUSCH resource assignment, $P_{O\_PUSCH}(j)$ and $\alpha(j)$ denote parameters, PL denotes a downlink path-loss estimation calculated by the terminal, and $\Delta_{TF}(i)$ denotes a UE-specific parameter. f(i) denotes a parameter acquired based on the TPC.

More specifically, a first value of f(i) can be expressed by $f(0)=\Delta P_{rampup}+TPC_{M2,c}$. $\Delta P_{rampup}$ denotes a parameter indicating an accumulative value of ramp-up power, and $TPC_{M2,c}$ is a value indicated by a TPC included in an RAR corresponding to a random access preamble transmitted to a cell c.

Transmit power $P_{PUCCH}(i)$ of a PUCCH transmitted at a subframe i of the secondary cell can be determined by the following equation.

$$P_{PUCCH}(i) = \min\{P_{CMAX}(i), P_{0\_PUCCH}+PL+h(n_{CQI}, n_{HARQ})+\Delta_{F\_PUCCH}(F)+g(i)\}$$ [Equation 5]

Herein, $P_{CMAX}(i)$ and PL are the same as those of Equation 4, and $P_{O\_PUCCH}(j)$ denotes a parameter composed of the sum of a cell-specific element $P_{O\_NOMINAL\_PUCCH}(j)$ and a UE-specific element $P_{O\_UE\_PUCCH}(j)$ which are provided from a higher layer. $h(n_{CQI}, n_{HARQ})$ denotes a value dependent on a PUCCH format. $\Delta_{F\_PUCCH}(F)$ denotes a parameter provided by the higher layer. g(i) denotes a parameter derived from the TPC.

More specifically, a first value of g(i) can be expressed by $g(0)=\Delta P_{rampup}+TPC_{M2,c}$. $\Delta P_{rampup}$ denotes a parameter indicating an accumulative value of ramp-up power, and $TPC_{M2,c}$ is a value indicated by a TPC included in an RAR corresponding to a random access preamble transmitted to a cell c.

Transmit power $P_{SRS}(i)$ of a PUCCH transmitted at a subframe i of the secondary cell can be determined by the following equation.

$$P_{SRS}(i) = \min\{P_{CMAX}(i), P_{SRS\_OFFSET}+10 \log_{10}(M_{SRS})+P_{O\_PUSCH}(j)+\alpha(j)PL+f(i)\}$$ [Equation 6]

Herein, $P_{CMAX}(i)$, $P_{O\_PUSCH}(j)$, $\alpha(j)$, PL, and f(i) are the same as those of Equation 4, $P_{SRS\_OFFSET}$ denotes a UE-specific parameter provided by a higher layer, and $M_{SRS}$ denotes a bandwidth for SRS transmission. A first value of f(i) can be expressed by $f(0)=\Delta P_{rampup}+TPC_{M2,c}$.

The TPC included in the RAR is used in f(0) and g(0) for determining transmit power of the PUSCH/PUCCH/SRS. Upon receiving the TPC included in the RAR, it can be said that the parameters are reset to f(0) and g(0) on the basis of the TPC.

If the message M3 is always transmitted only through the primary cell irrespective of a cell to which the message M1 is transmitted, it can be said that a TPC included in the message M2 is applied to the primary cell if the message M1 is transmitted to the primary cell, and is applied to the secondary cell if the message M1 is transmitted to the secondary cell.

If the message M3 is transmitted to the primary cell or another secondary cell other than the secondary cell to which the message M1 is transmitted, transmit power for the message M2 can be determined according to a configuration of a corresponding cell irrespective of the TPC included in the message M2. In this case, f(i) for M3 is not reset to f(0), and a currently accumulated f(i) can be applied.

Optionally, a PUSCH for the message M3 can also be determined based on the TPC in a case where the message M3 is transmitted through another cell other than the cell to which the message M1 is transmitted. In this case, initial transmit power of a UL channel transmitted afterwards through the cell to which the message M1 is transmitted may be configured by applying only a power ramp-up value without having to apply the TPC of the message M2. That is, the following configuration is possible. $f(0)=\Delta P_{rampup}$, $g(0)=\Delta P_{rampup}$.

If the message M3 is transmitted through the cell to which the message M1 is transmitted, the TAC included in the message M2 can be applied to the cell to which the message M1/M3 is transmitted. If the message M3 is transmitted to another cell other than the cell to which the message M1 is transmitted, the TAC included in the message M2 can be applied to the cell to which the message M1 is transmitted.

Figure 8:
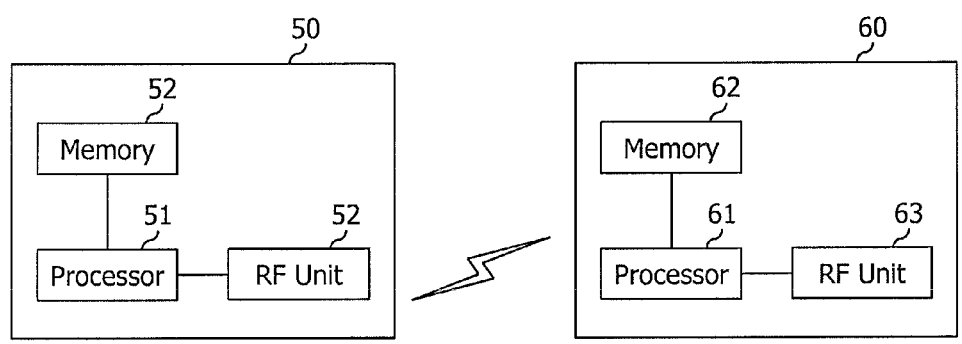
FIG. 8 is a block diagram showing a wireless communication system according to an embodiment of the present invention.

FIG. 8 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/receives a radio signal. The processor 51 implements the proposed functions, procedures, and/or methods. In the embodiment of FIG. 7 described above, the serving cell and/or the TA group can be controlled/managed by the BS, and an operation of one or more cells can be implemented by the processor 51.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/receives a radio signal. The processor 61 implements the proposed functions, procedures, and/or methods. In the embodiment of FIG. 7 described above, an operation of the UE can be implemented by the processor 61.

The processor may include an application-specific integrated circuit (ASIC), another chip set, a logical circuit, and/or a data processing unit. The RF unit may include a baseband circuit for processing radio signals. In software implemented, the aforementioned methods can be implemented with a module (i.e., process, function, etc.) for performing the aforementioned functions. The module may be performed by the processor 910.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for adjusting an uplink transmit power in a wireless communication system, the method performed by a user equipment (UE) configured with a carrier aggregation of a primary cell and a secondary cell, the method comprising:
transmitting, by the UE, a random access preamble for the secondary cell;
receiving, by the UE, a random access response through the primary cell in response to the random access preamble for the secondary cell, the random access response including a transmit power command (TPC);
determining, by the UE, that an uplink signal is to be transmitted to the secondary cell, and then using the TPC in the received random access response to determine the uplink transmit power;
determining, by the UE, that an uplink signal is to be transmitted to the primary cell, and then not using the TPC in the received random access response to determine the uplink transmit power; and
transmitting, by the UE, the uplink signal, based on the adjusted uplink transmit power, to the secondary cell.

2. The method of claim 1, wherein the secondary cell is activated by the primary cell.

3. The method of claim 1, wherein the primary cell is identified with a cell index of zero and the secondary cell is identified with a cell index of greater than zero.

4. The method of claim 1, further comprising:
receiving a resource allocation on a physical downlink control channel (PDCCH) through the primary cell,
wherein the random access response is received by using the resource allocation.

5. The method of claim 1, wherein the primary cell and the secondary cell use different frequencies.

6. The method of claim 1, wherein the uplink transmit power in subframe i for the secondary cell is given by:

$$P_{PUSCH}(i) = \min\left\{\begin{array}{l} P_{CMAX}(i), \\ 10\log_{10}(M_{PUSCH}(i)) + P_{O\_PUSCH}(j) + \alpha_c(j) \cdot PL + \Delta_{TF}(i) + f(i) \end{array}\right\}$$

where,
$P_{PUSCH}(i)$ is the uplink transmit power for physical uplink shared channel (PUSCH) transmission,
min{x,y} denotes a minimum of x and y,
$P_{CMAX}(i)$ is a configured maximum transmit power in subframe i,
$M_{PUSCH}(i)$ indicates a bandwidth assigned for PUSCH,
$P_{O\_PUSCH}(j)$ and $\alpha_c(j)$ are parameters,
PL indicates a downlink pathloss estimate,
$\Delta_{TF}(i)$ is a parameter, and
f(i) is a parameter determined based on the TPC.

7. The method of claim 1, wherein the uplink transmit power in subframe i for the secondary cell is given by:

$$P_{SRS}(i) = \min\{P_{CMAX}(i), P_{SRS\_OFFSET}(m) + 10\log_{10}(M_{SRS}) + P_{0\_PUSCH}(j) + \alpha(j) \cdot PL + f(i)\}$$

where,
$P_{SRS}(i)$ is the uplink transmit power for sounding reference signal (SRS) transmission,
min{x,y} denotes a minimum of x and y,
$P_{CMAX}(i)$ is a configured maximum transmit power in subframe i,
$P_{SRS\_OFFSET}(m)$ is a parameter,
$M_{SRS}$ indicates a bandwidth for the SRS transmission,
$P_{O\_PUSCH}(j)$ and $\alpha_c(j)$ are parameters,
PL indicates a downlink pathloss estimate, and
f(i) is a parameter determined based on the TPC.

8. The method of claim 1, wherein the user equipment is configured with multiple time alignment groups (TAGs) including a first TAG to which the primary cell belongs and a second TAG to which the secondary cell belongs.

9. The method of claim 8, wherein
the random access preamble is transmitted to the secondary cell belonging to the second TAG; and
the random access response is received from the primary cell belonging to the first TAG.

10. A user equipment configured for adjusting an uplink transmit power in a wireless communication system, the user equipment comprising:
a radio frequency (RF) unit configured with a carrier aggregation of a primary cell and a secondary cell to transmit and receive radio signals; and
a processor operatively coupled with the RF unit and configured to:
transmit a random access preamble for the secondary cell;
receive a random access response through the primary cell in response to the random access preamble, the random access response including a transmit power command (TPC);

determine that an uplink signal is to be transmitted to the secondary cell, and then use the TPC in the received random access response to determine the uplink transmit power;

determine that an uplink signal is to be transmitted to the primary cell, and then not use the TPC in the received random access response to determine the uplink transmit power; and transmit an uplink signal, based on the adjusted uplink transmit power, to the secondary cell.

11. The user equipment of claim 10, wherein the secondary cell is activated by the primary cell.

12. The user equipment of claim 10, wherein the primary cell is identified with a cell index zero and the secondary cell is identified with a cell index of greater than zero.

13. The user equipment of claim 10, wherein the processor is further configured to receive a resource allocation on a physical downlink control channel (PDCCH) through the primary cell, wherein the random access response is received by using the resource allocation.

14. The user equipment of claim 10, wherein the primary cell and the secondary cell use different frequencies.

15. The user equipment of claim 10, wherein the uplink transmit power in subframe i for the secondary cell is given by:

$$P_{PUSCH}(i) = \min\left\{ \begin{array}{l} P_{CMAX}(i), \\ 10\log_{10}(M_{PUSCH}(i)) + P_{O\_PUSCH}(j) + \alpha_c(j) \cdot PL + \Delta_{TF}(i) + f(i) \end{array} \right\}$$

where, $P_{PUSCH}(i)$ is the uplink transmit power for physical uplink shared channel (PUSCH) transmission, $\min\{x,y\}$ denotes a minimum of x and y, $P_{CMAX}(i)$ is a configured maximum transmit power in subframe i, $M_{PUSCH}(i)$ indicates a bandwidth assigned for PUSCH, $P_{O\_PUSCH}(j)$ and $\alpha_c(j)$ are parameters, PL indicates a downlink pathloss estimate, $\Delta_{TF}(i)$ is a parameter, and $f(i)$ is a parameter determined based on the TPC.

16. The user equipment of claim 10, wherein the uplink transmit power in subframe i for the secondary cell is given by:

$$P_{SRS}(i) = \min\{P_{CMAX}(i), P_{SRS\_OFFSET}(m) + 10\log_{10}(M_{SRS}) + P_{0\_PUSCH}(j) + \alpha(j) \cdot PL + f(i)\}$$

where, $P_{SRS}(i)$ is the uplink transmit power for sounding reference signal (SRS) transmission, $\min\{x,y\}$ denotes a minimum of x and y, $P_{CMAX}(i)$ is a configured maximum transmit power in subframe i, $P_{SRS\_OFFSET}(m)$ is a parameter, $M_{SRS}$ indicates a bandwidth for the SRS transmission, $P_{O\_PUSCH}(j)$ and $\alpha_c(j)$ are parameters, PL indicates a downlink pathloss estimate, and $f(i)$ is a parameter determined based on the TPC.

17. The user equipment of claim 10, wherein the user equipment is configured with multiple time alignment groups (TAGs) including a first TAG to which the primary cell belongs and a second TAG to which the secondary cell belongs.

18. The user equipment of claim 17, wherein the random access preamble is transmitted to the secondary cell belonging to the second TAG; and the random access response is received from the primary cell belonging to the first TAG.

* * * * *